(12) United States Patent
Ishii

(10) Patent No.: US 11,092,114 B2
(45) Date of Patent: Aug. 17, 2021

(54) VEHICLE CONTROL DEVICE

(71) Applicant: Hitachi Automotive Systems, Ltd., Hitachinaka (JP)

(72) Inventor: Kazuya Ishii, Hitachinaka (JP)

(73) Assignee: Hitachi Automotive Systems, Ltd., Hitachinaka (JP)

(*) Notice: Subject to any disclaimer, the term of this patent is extended or adjusted under 35 U.S.C. 154(b) by 51 days.

(21) Appl. No.: 16/641,746

(22) PCT Filed: Jul. 30, 2018

(86) PCT No.: PCT/JP2018/028382
§ 371 (c)(1),
(2) Date: Feb. 25, 2020

(87) PCT Pub. No.: WO2019/054067
PCT Pub. Date: Mar. 21, 2019

(65) Prior Publication Data
US 2020/0240367 A1 Jul. 30, 2020

(30) Foreign Application Priority Data
Sep. 15, 2017 (JP) .............................. JP2017-177713

(51) Int. Cl.
*F02D 41/22* (2006.01)
*F02M 25/08* (2006.01)
(Continued)

(52) U.S. Cl.
CPC ......... *F02M 25/0809* (2013.01); *F02D 45/00* (2013.01); *F02D 41/0032* (2013.01);
(Continued)

(58) Field of Classification Search
CPC .... F02M 25/0809; F02M 25/08; F02D 45/00; F02D 41/042; F02D 41/22
See application file for complete search history.

(56) References Cited

U.S. PATENT DOCUMENTS 6,556,901 B2 * 4/2003 Sugimura ................ F01P 11/16
701/33.6
6,564,622 B2 * 5/2003 Majkowski ........... F02D 41/065
73/114.01
(Continued)

FOREIGN PATENT DOCUMENTS

JP 2005-301615 A 10/2005
JP 2006-307721 A 11/2006
(Continued)

OTHER PUBLICATIONS

International Search Report (PCT/ISA/210) issued in PCT Application No. PCT/JP2018/028382 dated Nov. 13, 2018 with English translation (three (3) pages).
(Continued)

*Primary Examiner* — Thomas N Moulis
(74) *Attorney, Agent, or Firm* — Crowell & Moring LLP

(57) ABSTRACT

Provided is a vehicle control device configured to suppress power to be consumed by an arithmetic device while the vehicle operation is stopped, and to diagnose the operation frequency of the timer for abnormality. The vehicle control device of the present invention allows the bandpass filter to convert the operation frequency of the timer into the voltage value. The holding circuit holds the value corresponding to the converted voltage value. The arithmetic device diagnoses whether or not the timer has been normally operated using the voltage value held in the holding circuit.

8 Claims, 2 Drawing Sheets

(51) Int. Cl.
*F02D 45/00* (2006.01)
*F02D 41/00* (2006.01)
*F02D 41/04* (2006.01)

(52) U.S. Cl.
CPC ............ *F02D 41/042* (2013.01); *F02D 41/22* (2013.01); *F02D 2041/225* (2013.01)

(56) References Cited

U.S. PATENT DOCUMENTS

| | | | | |
|---|---|---|---|---|
| 7,284,530 | B2* | 10/2007 | Nagasaki | ........... F02M 25/0818 123/198 D |
| 8,155,917 | B2* | 4/2012 | Maegawa | ........... F02M 25/0818 702/140 |
| 8,384,240 | B2* | 2/2013 | Sato | ........................ G04R 20/04 307/10.1 |
| 9,080,519 | B2* | 7/2015 | Howell | ................... F02D 41/24 |
| 10,371,113 | B2* | 8/2019 | Sepulveda | ........... F02D 41/0027 |
| 2005/0234631 | A1* | 10/2005 | Nomura | ................ F02D 41/003 701/102 |
| 2006/0247835 | A1 | 11/2006 | Nagata | |
| 2006/0259209 | A1* | 11/2006 | Sugimura | .......... G01R 31/3278 701/1 |
| 2008/0098986 | A1* | 5/2008 | McKay | ................. F02D 11/107 123/396 |
| 2019/0078527 | A1* | 3/2019 | Kim | .................... F02D 41/2403 |
| 2019/0195157 | A1* | 6/2019 | Koo | ..................... G07C 5/0841 |

FOREIGN PATENT DOCUMENTS

| | | |
|---|---|---|
| JP | 2010-128942 A | 6/2010 |
| JP | 2010-180776 A | 8/2010 |

OTHER PUBLICATIONS

Japanese-language Written Opinion (PCT/ISA/237) issued in PCT Application No. PCT/JP2018/028382 dated Nov. 13, 2018 (three (3) pages).

* cited by examiner

VEHICLE CONTROL DEVICE

TECHNICAL FIELD

The present invention relates to a vehicle control device for controlling operations of a vehicle.

BACKGROUND ART

A generally employed vehicle control device has a function for diagnosing normality of the vehicle system while the vehicle operation is stopped. For example, upon turning of the vehicle ignition switch OFF, the vehicle control device diagnoses whether or not the evaporation purge system of the vehicle has been normally operated (whether or not the fuel leakage has occurred, for example).

At the time immediately following the engine operation under high loads for a long time, the fuel in the fuel tank is likely to be vaporised. Diagnosis of the evaporation purge system in the state as described above may result in inaccurate diagnostic results. Accordingly, the diagnosis of the evaporation purge system is generally started after an elapse of a predetermined time from a stoppage of the vehicle operation. It is necessary to provide a timer that starts counting time in response to turning of the vehicle ignition switch OFF. Such timer has been conventionally called a soak timer.

If the soak timer fails to accurately measure the time, the diagnosis may be started under the inappropriate condition for diagnosing the evaporation purge system. Therefore, it is necessary to check whether or not the soak timer has been normally operated. As the soak timer is started after turning the vehicle ignition switch OFF, power supply to the arithmetic device of the vehicle control device is suspended while the soak timer is operating. Therefore, a specific measure has to be taken to allow the arithmetic device to diagnose whether or not the soak timer has been normally operated.

Aiming at "provision of the electronic control device with soak timer, capable of performing failure diagnosis of the soak timer with higher reliability", Patent Literature 1 discloses the technology, explaining that "when the electronic control device is started under the condition that the time count reaches the time (set value) preset in the soak timer, the time counter of the soak timer is stopped. Based on the value of the stopped timer counter, the failure of the soak timer is diagnosed. Specifically, when the electronic control device is started by the soak timer, a "starting record flag" and the "starting counter value" as the timer counter value at that time are stored in the non-volatile memory (steps S203, S204). Upon starting of the electronic control device by turning the ignition switch ON, the "current counter" as the timer counter value at that time is read from the soak timer (step S205). The failure of the soak timer is diagnosed based on comparison of the "set values", "starting counter values", "current counter values" and the like".

CITATION LIST

Patent Literature

Patent Literature 1: Japanese Unexamined Patent Application Publication No. 2005-301615

SUMMARY OF INVENTION

Technical Problem

In the Patent Literature 1, the count value of the soak timer is stored in the memory. After the electronic control device is started, the stored value is checked, based on which it is diagnosed whether or not the soak timer has been normally operated. This method does not require the soak timer and the arithmetic device to be operated simultaneously, thus suppressing power consumption. Meanwhile, if abnormality occurs in the oscillating frequency of the crystal oscillator, for example, the time counting result of the soak timer becomes abnormal as well. In the Patent Literature 1, the count value is only checked. Even in the case of an abnormal count owing to the abnormal frequency, it may be diagnosed that the soak timer has been normally operated. That is, the technology disclosed in the Patent Literature 1 has difficulties in diagnosing abnormality in the operation frequency of the soak timer.

The present invention has been made to solve the above-described problem by providing the vehicle control device capable of suppressing power consumed by the arithmetic device while the vehicle operation is stopped, and diagnosing abnormality in the operation frequency of the timer.

Solution to Problem

The vehicle control device according to the present invention allows the bandpass filter to convert the operation frequency of the timer into the voltage value, and the holding circuit to hold the value corresponding to the voltage value. The arithmetic device diagnoses whether or not the timer has been normally operated using the voltage value held in the holding circuit.

Advantageous Effects of Invention

The vehicle control device according to the present invention is configured to suppress power consumed by the arithmetic device while the vehicle operation is stopped, and to diagnose abnormality in the operation frequency of the timer.

DESCRIPTION OF EMBODIMENT

First Embodiment

Figure 1:
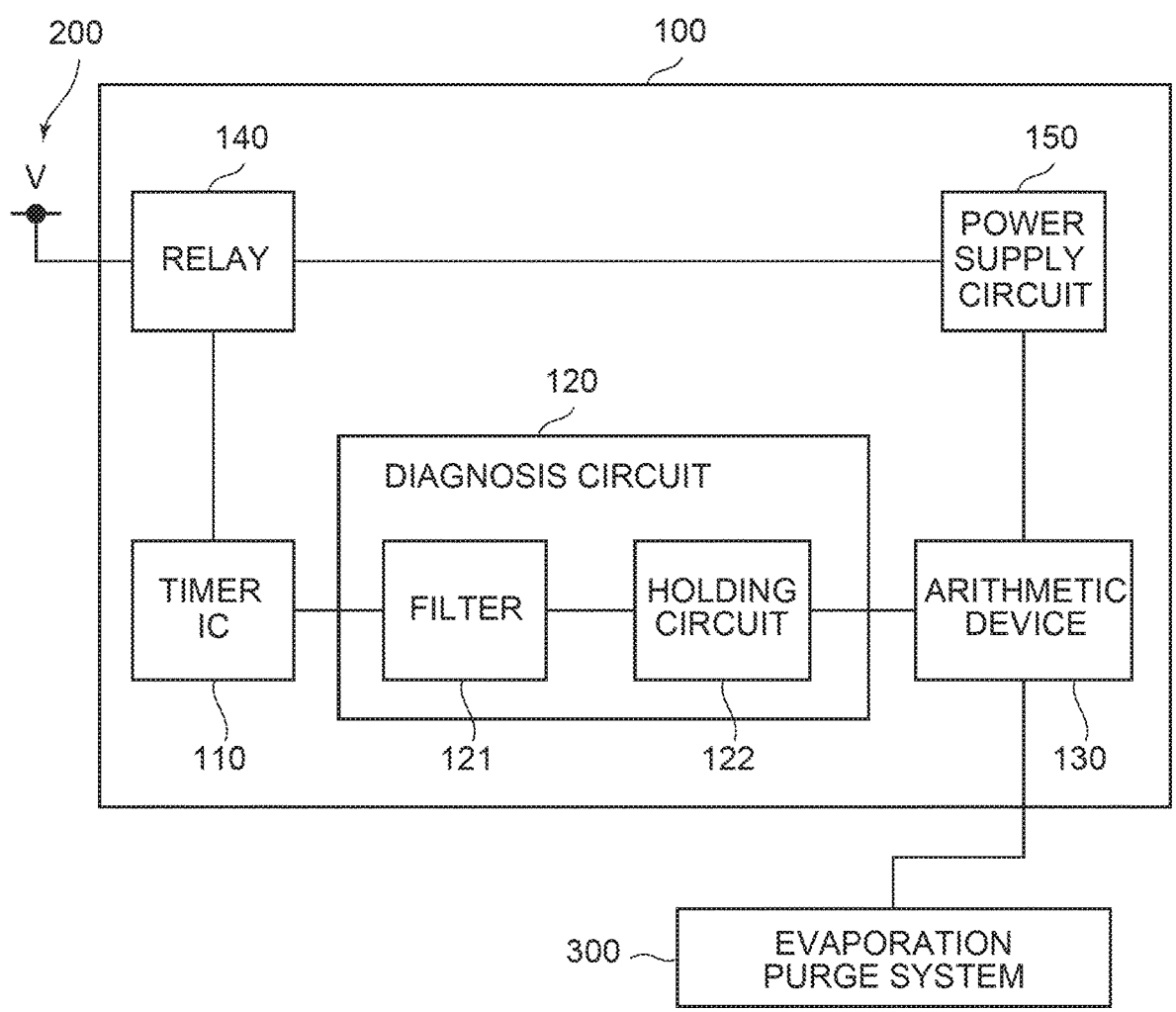
FIG. 1 is a function block diagram of a vehicle control device 100 according to a first embodiment.

FIG. 1 is a function block diagram of a vehicle control device 100 according to a first embodiment of the present invention. The vehicle control device 100 is an electronic control device for controlling operations of the vehicle. The vehicle control device 100 includes a timer IC (Integrated Circuit) 110, a diagnosis circuit 120, an arithmetic device 130, a relay 140, and a power supply circuit 150.

The timer IC 110 as a soak timer is configured to start counting when power supply to the vehicle control device 100 is shut off. When the count value reaches the preset value after the start of counting, the timer IC 110 outputs an ON signal to the relay 140. The timer IC 110 is configured to further output a reference clock signal to the diagnosis circuit 120 as a reference to the operation frequency of the timer IC 110 itself upon start of time counting.

The diagnosis circuit 120 includes a filter 121 and a holding circuit 122. The filter 121 as a bandpass filter is configured to pass the electric signal in a predetermined frequency band. The filter 121 filters the reference clock signal received from the timer IC 110. If the frequency band of the received signal deviates from the range of the pass-band, the filter 121 exhibits the filtering characteristic by outputting the voltage lower than the voltage in the case where the frequency band is in the range of the pass-band. The holding circuit 122 as a sample holding circuit is configured to hold a maximum value of the voltage to be output from the filter 121. The holding circuit 122 is capable of holding the value even if the power supply to the vehicle control device 100 is suspended.

The arithmetic device 130 is a device that executes the arithmetic operation for controlling operations of the vehicle. The arithmetic device 130 further diagnoses whether or not the vehicle system (for example, an evaporation purge system 300) has been normally operated. In the diagnosis process, the arithmetic device 130 diagnoses whether or not the timer IC 110 has been normally operated. Specifically, if the voltage value held in the holding circuit 122 is equal to or larger than a predetermined threshold value, it is diagnosed that the timer IC 110 has been operated at the appropriate clock frequency. If the voltage value is smaller than the predetermined threshold value, it is diagnosed that the clock frequency of the timer IC 110 is abnormal. The arithmetic device 130 diagnoses the evaporation purge system 300 only when the timer IC 110 has been normally operated.

The relay 140 switches connection between an external power supply 200 and the power supply circuit 150. While the vehicle control device 100 is shut down, the relay 140 disconnects the external power supply 200. Upon reception of the ON signal from the timer IC 110, the relay 140 connects the external power supply 200 to the power supply circuit 150. The power supply circuit 150 appropriately executes the process such as conversion of the power received via the relay 140, and supplies the power to the arithmetic device 130. The relay 140 may be constituted as a part of the power supply circuit 150.

The external power supply 200 is a battery mounted on the vehicle, for example. The evaporation purge system 300 is configured to adsorb the vaporized fuel in the fuel tank into the adsorbent, and to release the adsorbed fuel to an intake pipe of the engine under the predetermined condition. For example, the arithmetic device 130 diagnoses whether or not the vaporized fuel from the evaporation purge system 300 has been released to the atmosphere (whether or not leakage has occurred). As the diagnosis method is known, the explanation will not be specifically made.

Figure 2:
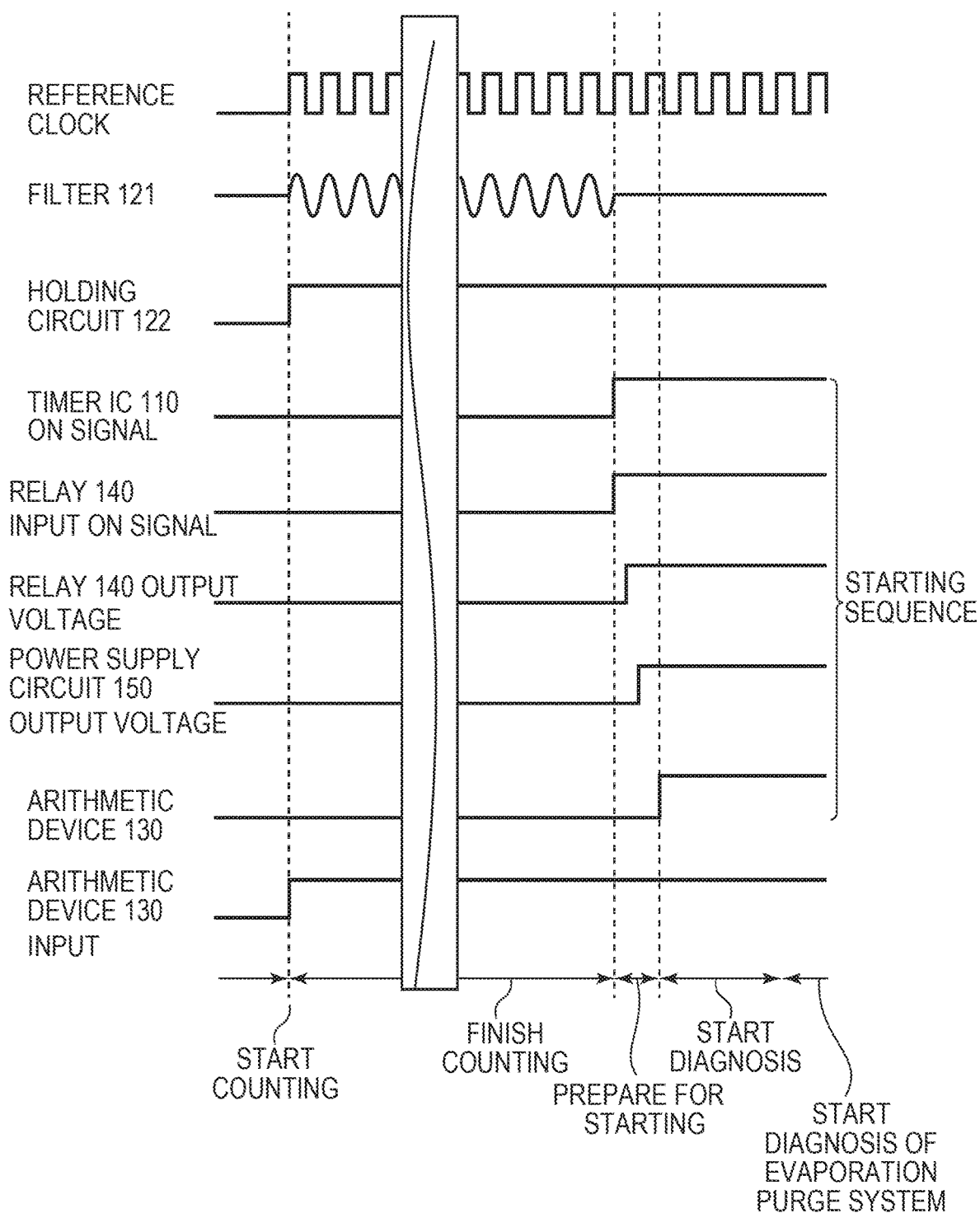
FIG. 2 is a timing chart explaining operations of the respective components after shut-off of power supply to the vehicle control device 100.

FIG. 2 is a timing chart for explaining operations of the respective components after shut-off of the power supply to the vehicle control device 100. Referring to FIG. 2, the procedure to be executed by the vehicle control device 100 for diagnosing the timer IC 110 will be described.

When the power supply to the vehicle control device 100 is shut off, the timer IC 110 starts counting (start counting). The timer IC 110 outputs the reference clock signal to the diagnosis circuit 120.

The filter 121 is characterized to pass the frequency band of the reference clock signal. If the frequency band of the reference clock signal is normal, the filter 121 outputs a sinusoidal signal with a fixed amplitude. If the frequency band of the reference clock signal deviates from the normal value, the frequency component of the reference clock signal input to the filter 121, specifically, the one in the pass-band range is made small. Therefore, the amplitude of the sinusoidal signal output from the filter 121 becomes smaller than the one in the normal state. The holding circuit 122 holds the maximum value of the sinusoidal signal to be output from the filter 121.

Upon completion of time counting, the timer IC 110 outputs the ON signal to the relay 140 (finish counting). Upon reception of the ON signal, the relay 140 supplies power from the external power supply 200 to the power supply circuit 150. The arithmetic device 130 is activated upon reception of power from the power supply circuit 150 to start diagnosing (start diagnosis).

The arithmetic device 130 determines whether or not the voltage value held in the holding circuit 122 is in a predetermined normal range (equal to or larger than a predetermined threshold value). If it is in the normal range, it is diagnosed that the reference clock of the timer IC 110 is in the normal state. If it deviates from the normal range, it is diagnosed as being in the abnormal state. If the timer IC 110 is diagnosed as being in the normal state, the arithmetic device 130 diagnoses the evaporation purge system 300. If it is diagnosed as being in the abnormal state, the arithmetic device 130 does not perform the diagnosis. Upon completion of the diagnosis including the one for the evaporation purge system 300, the arithmetic device 130 is shut down.

First Embodiment: Summary

The vehicle control device 100 according to the first embodiment allows the filter 121 to detect the frequency of the reference clock of the timer IC 110. The detection result is held in the holding circuit 122. This makes it possible to diagnose whether or not the reference clock of the timer IC 110 is normal. The arithmetic device 130 does not have to be operated constantly for diagnosis of the timer IC 110. This makes it possible to suppress consumption of power required for the diagnosis.

Second Embodiment

In the first embodiment, the holding circuit 122 is constituted as the sample holding circuit for holding the maximum value output from the filter 121. The holding circuit 122 is configured to hold the voltage indicating whether or not the sinusoidal signal output from the filter 121 is normal. Therefore, it may be configured into the form other than the sample holding circuit. In the second embodiment, another form constituting the holding circuit 122 will be described.

The holding circuit 122 may be constituted by an element (for example, a capacitor) for accumulating the sinusoidal signals output from the filter 121 as the charge. The holding circuit 122 holds the voltage level corresponding to the amount of the charge to be accumulated. The arithmetic device 130 diagnoses whether or not the reference clock of the timer IC 110 is normal by determining whether or not the voltage level held in the holding circuit 122 is in the normal range.

The holding circuit 122 may be constituted by a register that holds a bit value indicating whether or not the maximum value of the sinusoidal signal output from the filter 121 is in the normal range. The diagnosis circuit 120 compares the amplitude of the sinusoidal signal output from the filter 121 with the preset normal range, and stores the comparison result in the holding circuit 122. The arithmetic device 130 is capable of diagnosing whether or not the reference clock of the timer IC 110 is normal in accordance with the bit value held in the holding circuit 122.

Modification of the Invention

The present invention is not limited to the embodiments as described above, but includes various modifications. For example, the embodiments have been described in detail for readily understanding of the present invention which is not necessarily limited to the one equipped with all structures as described above. It is possible to replace a part of the structure of the embodiment with the structure of another embodiment. The one embodiment may be provided with an additional structure of another embodiment. It is further possible to add, remove, and replace the other structure to, from and with a part of the structure of the respective embodiments.

LIST OF REFERENCE SIGNS

100: vehicle control device
121: filter
122: holding circuit
130: arithmetic device
140: relay
150: power supply circuit
200: external power supply
300: evaporation purge system

The invention claimed is:

1. A vehicle control device for controlling operations of a vehicle, comprising:
 a timer that starts counting when power supply to the vehicle control device is shut off;
 a bandpass filter that passes an electric signal in a predetermined frequency band;
 a holding circuit that holds a voltage corresponding to the electric signal output from the bandpass filter;
 an arithmetic device that diagnoses whether or not the timer has been normally operated; and
 a power supply circuit that supplies power to the arithmetic device, wherein:
 the timer is configured to output a reference clock signal to the bandpass filter as a reference to an operation frequency of the timer at a predetermined frequency in response to start of counting, and to output a start signal when counting is continued to reach a predetermined number of counts;
 the power supply circuit starts power supply to the arithmetic device when the timer outputs the start signal; and
 the arithmetic device diagnoses whether or not the timer has been normally operated using the voltage held in the holding circuit in response to reception of the power from the power supply circuit.

2. The vehicle control device according to claim 1, wherein if a frequency of the reference clock signal deviates from a range of the frequency band, the bandpass filter is configured to output a voltage lower than a voltage in a state where the frequency of the reference clock signal is in the range of the frequency band.

3. The vehicle control device according to claim 2, wherein:
 the holding circuit holds a maximum value of the voltage output from the bandpass filter;
 if the voltage held in the holding circuit is equal to or larger than a predetermined threshold value, the arithmetic device determines that the timer has been normally operated; and
 if the voltage is smaller than the predetermined threshold value, the arithmetic device determines that the timer has not been normally operated.

4. The vehicle control device according to claim 1, wherein:
 when the power from the power supply circuit is received, the arithmetic device diagnoses whether or not an evaporation purge system of the vehicle has been normally operated; and
 when the diagnosis is completed, the arithmetic device is shut down.

5. The vehicle control device according to claim 4, wherein:
 when a determination is made that the timer has been normally operated, the arithmetic device diagnoses the evaporation purge system; and
 when a determination is made that the timer has not been normally operated, the arithmetic device does not diagnose the evaporation purge system.

6. The vehicle control device according to claim 2, wherein:
 the holding circuit is configured to accumulate a charge using the electric signal output from the bandpass filter, and to hold the voltage corresponding to the charge; and
 when the voltage held in the holding circuit is equal to or larger than a predetermined threshold value, the arithmetic device determines that the timer has been normally operated; and
 when the voltage held in the holding circuit is smaller than the predetermined threshold value, the arithmetic device determines that the timer has not been normally operated.

7. The vehicle control device according to claim 2, wherein:
 the holding circuit is configured to store a value indicating whether or not a maximum value of the voltage output from the bandpass filter is equal to or larger than a predetermined threshold value;
 if the holding circuit stores the value indicating that the maximum value of the voltage output from the bandpass filter is equal to or larger than the predetermined threshold value, the arithmetic device determines that the timer has been normally operated; and
 if the holding circuit stores the value indicating that the maximum value is smaller than the predetermined threshold value, the arithmetic device determines that the timer has not been normally operated.

8. The vehicle control device according to claim 1, wherein:
 the power supply circuit further includes a relay that allows supply and shut-off of the power fed from outside the vehicle control device;
 the timer turns the relay ON by outputting the start signal to the relay; and
 when the relay is turned ON in response to the start signal, the power fed from outside the vehicle control device is supplied to the arithmetic device.

* * * * *